(12) United States Patent
Harajiri et al.

(10) Patent No.: US 10,173,263 B2
(45) Date of Patent: Jan. 8, 2019

(54) ADDITIVE MANUFACTURING APPARATUS

(71) Applicant: TOYOTA JIDOSHA KABUSHIKI KAISHA, Toyota-shi, Aichi-ken (JP)

(72) Inventors: Katsuji Harajiri, Toyota (JP); Yoshiyuki Mitsuya, Okazaki (JP); Takeshi Kimura, Toyota (JP); Michiyoshi Keta, Toyota (JP); Seiji Niwa, Nissin (JP); Katsuhiro Ito, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 481 days.

(21) Appl. No.: 15/092,254

(22) Filed: Apr. 6, 2016

(65) Prior Publication Data
US 2016/0297005 A1  Oct. 13, 2016

(30) Foreign Application Priority Data
Apr. 13, 2015 (JP) ................................. 2015-081703

(51) Int. Cl.
*B29C 64/20* (2017.01)
*B29C 64/321* (2017.01)
*B22F 3/105* (2006.01)
*B33Y 30/00* (2015.01)
*B29C 64/153* (2017.01)

(52) U.S. Cl.
CPC .... *B22F 3/1055* (2013.01); *B22F 2003/1056* (2013.01); *B22F 2999/00* (2013.01); *B29C 64/153* (2017.08); *B33Y 30/00* (2014.12); *Y02P 10/295* (2015.11)

(58) Field of Classification Search
CPC ....... B29C 64/20; B29C 64/30; B29C 64/307; B29C 64/321; B29C 64/329; B22F 3/1055; B22F 3/1058
USPC .................................................. 425/375, 78
See application file for complete search history.

(56) References Cited

U.S. PATENT DOCUMENTS

| | | | |
|---|---|---|---|
| 2001/0045678 A1* | 11/2001 | Kubo | B29C 64/165 425/215 |
| 2002/0090410 A1* | 7/2002 | Tochimoto | B29C 64/165 425/215 |
| 2005/0280185 A1 | 12/2005 | Russell et al. | |
| 2008/0047628 A1 | 2/2008 | Davidson et al. | |

FOREIGN PATENT DOCUMENTS

| | | |
|---|---|---|
| JP | 2010-089438 A | 4/2010 |
| JP | 2015-020328 A | 2/2015 |

* cited by examiner

*Primary Examiner* — Joseph S Del Sole
*Assistant Examiner* — Thu Khanh T Nguyen
(74) *Attorney, Agent, or Firm* — Oliff PLC

(57) ABSTRACT

An additive manufacturing apparatus includes a shaping part, a powder feeding part that feeds the powder material to the shaping part, a powder storage part that stores the powder material, and a pipe through which the powder material is transferred from the powder storage part to the powder feeding part. The powder storage part is arranged on a lower side of the powder feeding part in the vertical direction. The pipe is provided with a bent part in a transfer section in which the powder material is transferred from a lower side to an upper side in the vertical direction. The bent part stops the falling of the powder material that is present in the transfer section in the middle of the transfer section when the suction is stopped.

4 Claims, 9 Drawing Sheets

ADDITIVE MANUFACTURING APPARATUS

INCORPORATION BY REFERENCE

The disclosure of Japanese Patent Application No. 2015-081703 filed on Apr. 13, 2015 including the specification, drawings and abstract is incorporated herein by reference in its entirety.

BACKGROUND OF THE INVENTION

1. Field of the Invention

The invention relates to an additive manufacturing apparatus.

2. Description of Related Art

In recent years, an additive manufacturing apparatus has attracted attention. The additive manufacturing apparatus manufactures a laminated object having a three-dimensional shape by irradiating a powder material made from an inorganic material or an organic material with a laser beam so that the powder material is sintered or melted and solidified. To be specific, a step of forming a powder layer by spreading a powder material over a stage, and a step of forming a hardened layer are repeated. The hardened layer is formed by irradiating a given region of the powder layer with a laser beam so as to sinter or melt and solidify the powder layer. Therefore, it is possible to manufacture an object having a three-dimensional shape by laminating and integrating a number of hardened layers.

An additive manufacturing apparatus is disclosed in Japanese Patent Application Publication No. 2010-89438 (JP 2010-89438 A). The additive manufacturing apparatus includes an irradiation part that irradiates a powder material on a stage with a laser beam, a stage moving mechanism that moves the stage, a powder feeding part that feeds a powder material on the stage, and a powder storage part that stores the powder material. In the additive manufacturing apparatus disclosed in JP 2010-89438 A, a powder material is transferred from the powder storage part to the powder feeding part by using a pipe, and the powder storage part is arranged on a vertically lower side of the powder feeding part.

Like an additive manufacturing apparatus 100 shown in FIG. 11, in a case where a powder feeding part 36 is arranged on a vertically upper side of a powder storage part 40, it is possible to transfer a powder material from the powder storage part 40 to the powder feeding part 36 by sucking the powder material from the powder feeding part 36 side. In the additive manufacturing apparatus 100 having the above-mentioned structure, a pipe 143, which connects the powder feeding part 36 with the powder storage part 40, extends in the vertical direction. The details of the additive manufacturing apparatus 100 are given later.

However, when suction of the powder material is stopped after the powder material is transferred from the powder storage part 40 to the powder feeding part 36, the powder material inside the pipe 143 that extends in the vertical direction falls freely. At this time, when the powder material falls from a high position (for example, an upper end 142*a* of the pipe 143), an impact of collision between the powder materials becomes great, and the powder materials agglutinate with each other. When the powder materials agglutinate with each other, a mass of each aggregate increases, thus causing a problem that the agglutinated powder material cannot be transferred when the suction is resumed.

SUMMARY OF THE INVENTION

The invention provides an additive manufacturing apparatus that is able to restrain a powder material from agglutinating when the powder material is transferred.

A first aspect of the invention relates to an additive manufacturing apparatus including a shaping part that allows a powder material to be solidified and forms a three-dimensional object, a powder feeding part that feeds the powder material to the shaping part, a powder storage part that stores the powder material to be fed to the powder feeding part, and a pipe through which the powder material is transferred from the powder storage part to the powder feeding part. The powder storage part is arranged on a vertically lower side of the powder feeding part, and the powder material is transferred from the powder storage part to the powder feeding part as the powder material is sucked from the powder feeding part side. The pipe is provided with a bent part in a transfer section in which the powder material is transferred from a lower side to an upper side in a vertical direction. The bent part stops the falling of the powder material that is present in the transfer section in the middle of the transfer section when the suction of the powder material is stopped. The bent part is arranged at a position in the pipe so that a maximum falling distance of the powder material when the suction is stopped becomes shorter than a falling distance at which the powder material collides and agglutinates with each other when the powder material falls.

In this additive manufacturing apparatus, in the transfer section of the pipe in which the powder material is transferred from the lower side to the upper side in the vertical direction, the bent part is provided, which stops the falling of the powder material that is present in the transfer section in the middle of the transfer section when the suction is stopped. The bent part is arranged so that the maximum falling distance of the powder material when the suction is stopped becomes shorter than the falling distance at which the powder material collides and agglutinates with each other when the powder material falls. By providing the bent part as stated above, it is possible to reduce an impact when the powder material falls and collides with each other, thereby restraining the powder material from agglutinating with each other. Therefore, when the suction is resumed, it is possible to resume transfer of the powder material accumulated in the pipe.

The bent part may have a shape in which two horizontal pipes extending in a horizontal direction and one vertical pipe extending in the vertical direction are connected with each other in a U-shape. By allowing the bent part to have the U-shape as stated above, it is possible to narrow a space occupied by the pipe in the horizontal direction compared to the case where the pipe is inclined moderately like the additive manufacturing apparatus disclosed in JP 2010-89438 A. Thus, it is possible to reduce the size of the structure of the apparatus.

The horizontal pipe may be inclined with respect to the horizontal direction, and, among angles formed by the horizontal pipe and the vertical pipe arranged on a powder feeding part side with respect to the horizontal pipe, an angle on an inner side of the bent part may be an acute angle. With such a structure, it is possible to restrain the powder material from flowing backward when the suction of the powder material is stopped, and it is also possible to ensure that the powder material is accumulated in the bent part.

A pressurizing part may further be provided. The pressurizing part increases a flow rate of gas flowing in the horizontal pipe extending in the horizontal direction at a time of the suction of the powder material, and assists transfer of the powder material accumulated in the horizontal pipe extending in the horizontal direction. By providing the pressurizing part as stated above, it is possible to increase a flow rate of gas flowing in the horizontal pipe at the time of suction, and assist transfer of the powder material accumulated in the horizontal pipe.

According to the invention, it is possible to provide an additive manufacturing apparatus that is able to restrain a powder material from agglutinating with each other when the powder material is transferred.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
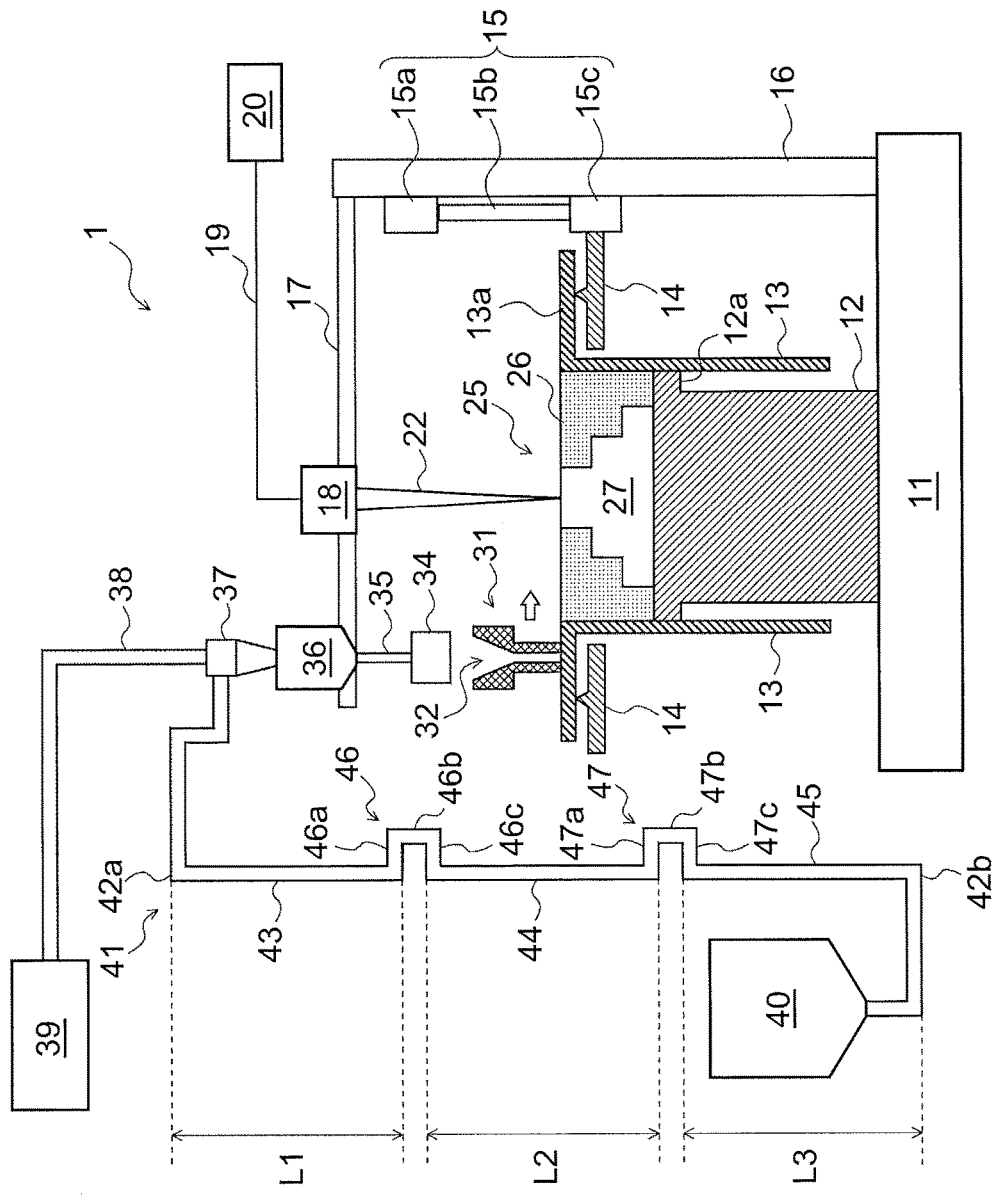
FIG. 1 is a view for explaining an additive manufacturing apparatus according to the first embodiment.

Herein below, embodiments of the invention are explained with reference to the drawings. FIG. 1 is a view for explaining an additive manufacturing apparatus 1 according to the first embodiment. As shown in FIG. 1, the additive manufacturing apparatus 1 according to this embodiment is provided with a base 11, a surface plate 12, a shaping tank 13, a shaping tank supporting part 14, a shaping tank driving part 15, a column 16, a supporting part 17, a laser scanner 18, an optical fiber 19, a laser oscillator 20, a powder layer forming part 31, a powder distributor 34, a powder feeding part 36, a pressure reducing device 39, and a powder storage part 40.

The base 11 is a stand for fixing the surface plate 12 and the column 16. The base 11 is installed on a floor surface so that an upper surface of the base 11, on which the surface plate 12 is mounted, becomes horizontal.

The surface plate 12 is mounted on and fixed to the horizontal upper surface of the base 11. An upper surface of the surface plate 12 is also horizontal, and powder is spread over the upper surface (stage) of the surface plate 12 and a three-dimensional object 27 is formed. In the example shown in FIG. 1, the surface plate 12 is a square columnar member. As shown in FIG. 1, in the entire peripheral edge of the upper surface of the surface plate 12, a flange-shaped projecting part 12a is formed, overhanging in the horizontal direction. Because an entire outer periphery surface of the projecting part 12a is in contact with an inner side surface of the shaping tank 13, it is possible to hold a laminated powder layer 26 in a space surrounded by the upper surface of the surface plate 12 and the inner side surface of the shaping tank 13. In this embodiment, the powder material is an inorganic material such as a metal material and a ceramic material.

The shaping tank 13 is a cylindrical member that holds the powder, which is spread over the upper surface of the surface plate 12, from the side. The powder layer 26 is formed in a shaping part 25 that is an upper opening end of the shaping tank 13, and the powder layer 26 is irradiated with a laser beam 22, thereby forming a hardened layer. The shaping tank 13 is installed so as to be able to move up and down (in the vertical direction). Every time the hardened layer is formed, the shaping tank 13 is lifted by a certain amount with respect to the surface plate 12, thus forming the three-dimensional object 27.

The shaping tank supporting part 14 is a supporting member that supports a lower surface of a flange part 13a of the shaping tank 13 so that an upper surface of the flange part 13a becomes horizontal. The shaping tank supporting part 14 is connected with a connecting part 15c of the shaping tank driving part 15 that allows the shaping tank 13 to move up and down (in the vertical direction).

The shaping tank driving part 15 is a driving mechanism for moving the shaping tank 13 up and down. The shaping tank driving part 15 is fixed to the column 16 erected from the base 11 in the vertical direction. The shaping tank driving part 15 is provided with a motor 15a, a ball screw 15b, and the connecting part 15c. When the motor 15a is driven, the ball screw 15b extending in the vertical direction rotates. Then, as the ball screw 15b rotates, the connecting part 15c moves up and down along the ball screw 15b. Thus, the shaping tank 13 moves up and down.

The laser scanner 18 irradiates the powder layer 26 with the laser beam 22. The powder layer 26 is formed in the shaping part 25 that is the upper opening end of the shaping tank 13. The laser scanner 18 is provided with a lens and a mirror (not shown), and is able to perform scanning with the laser beam 22 on a horizontal plane. In short, the laser scanner 18 is able to selectively heat and solidify an arbitrary area of the powder material on the horizontal plane. The laser beam 22 is generated in the laser oscillator 20 and introduced to the laser scanner 18 through the optical fiber 19. The laser scanner 18 is fixed to the supporting part 17.

The powder layer forming part 31 feeds the powder material to the shaping part 25 and forms the powder layer 26. The powder distributor 34 measures the powder material fed from the powder feeding part 36 through a pipe 35, and throws a given amount of the powder material into an opening 32 of the powder layer forming part 31. In short, the powder layer forming part 31 holds a given amount of the powder material in the opening 32, and, thereafter, moves in the horizontal direction (the left and right direction on the sheet), thereby forming the powder layer 26 in the shaping part 25.

Specifically, when the three-dimensional object 27 is formed, the shaping tank driving part 15 moves the shaping tank 13 upwardly. Thus, a difference in level is made between the uppermost layer of the powder layer 26 and the upper surface of the flange part 13a of the shaping tank 13. Thereafter, as the powder layer forming part 31 moves in the horizontal direction (to the right on the sheet), a new powder layer 26 is formed on top of the uppermost layer of the powder layer 26. At this time, the uppermost layer of the powder layer 26 and the upper surface of the flange part 13a are in the same plane (in short, there is no longer difference in level). Thereafter, a given region of the powder layer 26 is irradiated with the laser beam 22 so that the powder layer 26 is selectively heated and solidified. Then, the shaping tank 13 is moved upwardly, and the same operation is repeated. After the shaping tank 13 is moved upwardly, a step of forming the powder layer 26 by using the powder layer forming part 31, and a step of selectively solidifying the powder layer 26 by using the laser beam 22 are repeated. Thus, the three-dimensional object 27 is formed.

The powder feeding part 36 temporarily stores the powder material to be fed to the shaping part 25. The powder storage part 40 stores the powder material to be fed to the powder feeding part 36. The powder storage part 40 stores the powder material used to form the three-dimensional object, and the capacity of the powder storage part 40 is sufficiently larger than the capacity of the powder feeding part 36. When the powder storage part 40 is arranged on a vertically upper side in the vertical direction, a dust problem caused by the powder material, a problem of transportation of the powder material, and a risk of working in a high place are considered to happen. Therefore, the powder storage part 40 is arranged on a lower side of the powder feeding part 36 in the vertical direction (preferably placed on a floor).

The powder material is transferred from the powder storage part 40 to the powder feeding part 36 through a pipe 41. At this time, the powder material is transferred from the powder storage part 40 to the powder feeding part 36 as the powder material is sucked from the powder feeding part 36 side. In short, the pressure reducing device 39 is connected with the powder feeding part 36 through a pipe 38, and, as the pressure reducing device 39 reduces pressure of the powder feeding part 36, the powder material stored in the powder storage part 40 is sucked to the powder feeding part 36 side. The pipe 38 and the pipe 41 are connected with the powder feeding part 36 through the branch part 37. Once a certain amount of the powder material is transferred to the powder feeding part 36 (in short, when the capacity of powder feeding part 36 becomes full), the pressure reducing device 39 is stopped and transfer of the powder material from the powder storage part 40 to the powder feeding part 36 is stopped.

Then, in the additive manufacturing apparatus 1 according to this embodiment, bent parts 46, 47 are provided in a transfer section in which the powder material is transferred from the lower side to the upper side of the pipe 41 in the vertical direction (in short, between a lower end 42b and an upper end 42a of the pipe 41). The bent parts 46, 47 play a role of stopping the falling of the powder material, which is present in the transfer section, in the middle of the transfer section when the suction is stopped.

The bent part 46 shown in FIG. 1 has a shape in which two horizontal pipes 46a, 46c extending in the horizontal direction and one vertical pipe 46b extending in the vertical direction are connected with each other in a U-shape. One end of the horizontal pipe 46a is connected with a pipe 43, and the other end of the horizontal pipe 46a is connected with one end of the vertical pipe 46b. One end of the horizontal pipe 46c is connected with a pipe 44, and the other end of the horizontal pipe 46c is connected with the other end of the vertical pipe 46b.

Similarly, the bent part 47 has a shape in which two horizontal pipes 47a, 47c extending in the horizontal direction and one vertical pipe 47b extending in the vertical direction are connected with each other in a U-shape. One end of the horizontal pipe 47a is connected with the pipe 44, and the other end of the horizontal pipe 47a is connected with one end of the vertical pipe 47b. One end of the horizontal pipe 47c is connected with a pipe 45, and the other end of the horizontal pipe 47c is connected with the other end of the vertical pipe 47b.

In the case where the powder material is transferred from the powder storage part 40 to the powder feeding part 36, the pressure reducing device 39 is used to reduce pressure of the powder feeding part 36. Thus, the powder material is sucked from the powder feeding part 36 side, and the powder material is transferred from the powder storage part 40 to the powder feeding part 36 through inside of the pipe 41. Thereafter, when the pressure reducing device 39 is stopped and the suction is stopped, the powder material present inside the pipes 43, 44, 45 extending in the vertical direction falls freely.

At this time, when the powder material inside the pipe 43 falls freely, the maximum falling distance corresponds to a length L1 of the pipe 43. When the powder material inside the pipe 44 falls freely, the maximum falling distance corresponds to a length L2 of the pipe 44. When the powder material inside the pipe 45 falls freely, the maximum falling distance corresponds to a length L3 of the pipe 45.

In this embodiment, the bent parts 46, 47 are arranged so that the maximum falling distances L1 to L3 of the powder material when the suction is stopped become shorter than a falling distance at which the powder material collides and agglutinates with each other when the powder material falls. The falling distance, at which a powder material collides and agglutinates with each other when the powder material falls, may be decided arbitrarily in accordance with the powder material to be used. Further, the distances L1 to L3 may also be decided further in consideration of a density of powder while being transferred (corresponding to an accumulation amount of a powder material after the suction is stopped), cohesive force of a powder material, and suction force.

Figure 11:
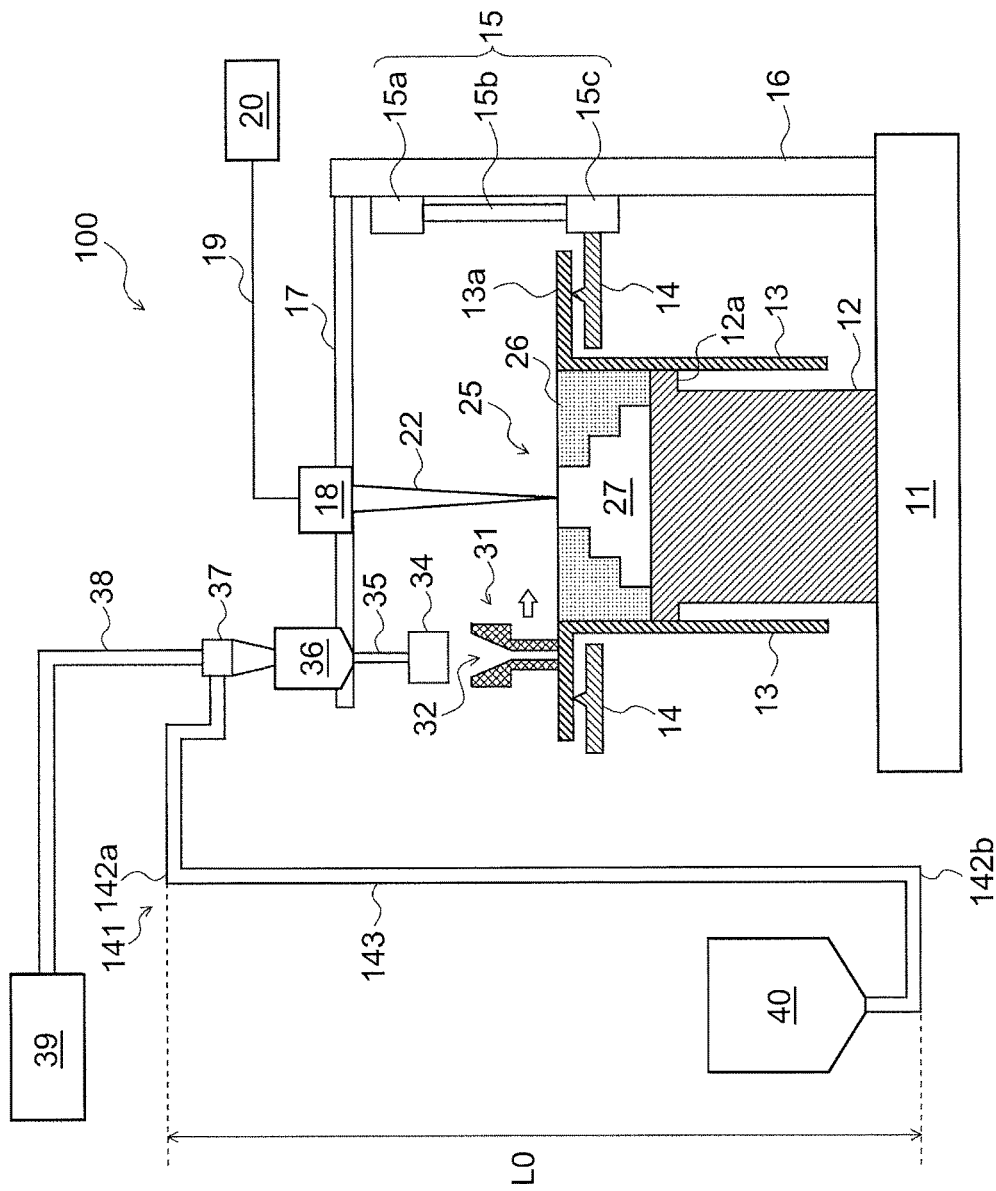
FIG. 11 is a view for explaining a problem to be solved by the invention.

FIG. 11 is a view for explaining a problem to be solved by the invention. In the additive manufacturing apparatus 100 shown in FIG. 11, the same components as those of the additive manufacturing apparatus 1 shown in FIG. 1 are denoted by the same reference numerals. Like the additive manufacturing apparatus 100 shown in FIG. 11, when no bent part is provided in a pipe 143 extending in the vertical direction out of the pipe 141 that connects the powder feeding part 36 with the powder storage part 40, the maximum falling distance of a powder material inside the pipe 143 when the powder material falls freely becomes a length L0 of the pipe 143 (in short, a distance between an upper end 142a and a lower end 142b of the pipe 143). Here, a powder material at a high position has large potential energy. Therefore, when the powder material falls from a high position, an impact becomes great when the powder material collides with each other, thereby making the powder material agglutinate with each other. When the powder material agglutinates with each other as stated above, a mass of each aggregate is increased. Therefore, there has been a problem that the agglutinated powder material cannot be transferred when the suction is resumed. This problem is especially noticeable when a powder material with a large mass, such as metal powder, is used.

In a case where a powder material falling afterwards collides with a powder material accumulated in the lower end 142b of the pipe 143, due to an impact of the collision, a phenomenon similar to that resulted from tapping of the powder material happens. Therefore, there are instances where the powder material accumulated in the lower end 142b of the pipe 143 is compressed, and it is not possible to transfer the compressed powder material even when the suction is resumed. In the additive manufacturing apparatus disclosed in JP 2010-89438 A, a pipe that connects the powder storage part, which is arranged on a lower side in the vertical direction, with a powder feeding part, which is arranged on an upper side in the vertical direction, is inclined moderately. However, when the pipe that connects the powder storage part with the powder feeding part is inclined moderately, a space occupied by the pipe becomes large in the horizontal direction, thereby increasing the size of the apparatus structure.

On the other hand, in the additive manufacturing apparatus 1 according to this embodiment, as shown in FIG. 1, the bent parts 46, 47 are provided in the transfer section in which the powder material is transferred from the lower side to the upper side of the pipe 41 in the vertical direction (in short, between the lower end 42b and the upper end 42a of the pipe 41). The bent parts 46, 47 play a role of stopping the falling of the powder material, which is present in the transfer section, in the middle of the transfer section when the suction is stopped. In short, since no bent part is provided in the additive manufacturing apparatus 100 shown in FIG. 11, when the powder material inside the pipe 143 freely falls, the maximum falling distance is the length L0. On the other hand, in the additive manufacturing apparatus 1 according to this embodiment shown in FIG. 1, because the bent parts 46, 47 are provided, it is possible to make the maximum falling distances L1 to L3 of the powder material when the suction is stopped shorter than L0. The bent parts 46, 47 are arranged so that the maximum falling distances L1 to L3 of the powder material become shorter than the falling distance at which the powder material collides and agglutinates with each other when falling. The bent parts 46, 47 may also be arranged so that the length L1, the length L2, and the length L3 become equal to each other.

As stated above, in the additive manufacturing apparatus 1 according to this embodiment, since the bent parts 46, 47 are provided, it is possible to reduce an impact when the powder material falls and collides with each other (in short, it is possible to reduce potential energy that powder material has), and it is possible to prevent the powder material from agglutinating with each other. Therefore, when the suction is resumed, it is possible to transfer the powder material accumulated in the pipe 41 again.

By providing the bent parts 46, 47, it is possible to reduce an impact when the powder material falls and collides with each other, thereby restraining the above-explained tapping phenomenon from happening. Further, by providing the bent parts 46, 47, it is possible to disperse locations where the powder material is accumulated (in short, the powder material is accumulated in a lower end of each of the pipes 43, 44, 45). This makes is possible to easily transfer the powder material accumulated in the pipe 41 when the suction is resumed. Moreover, by forming the bent parts 46, 47 into the U-shape, a space occupied by the pipe 41 in the horizontal direction becomes narrower compared to the case where the pipe is inclined moderately like the additive manufacturing apparatus disclosed in JP 2010-89438 A. Thus, it is possible to reduce the size of the structure of the apparatus (this also applies to the case where the bent part is shaped into an L shape as explained later).

Figure 2:
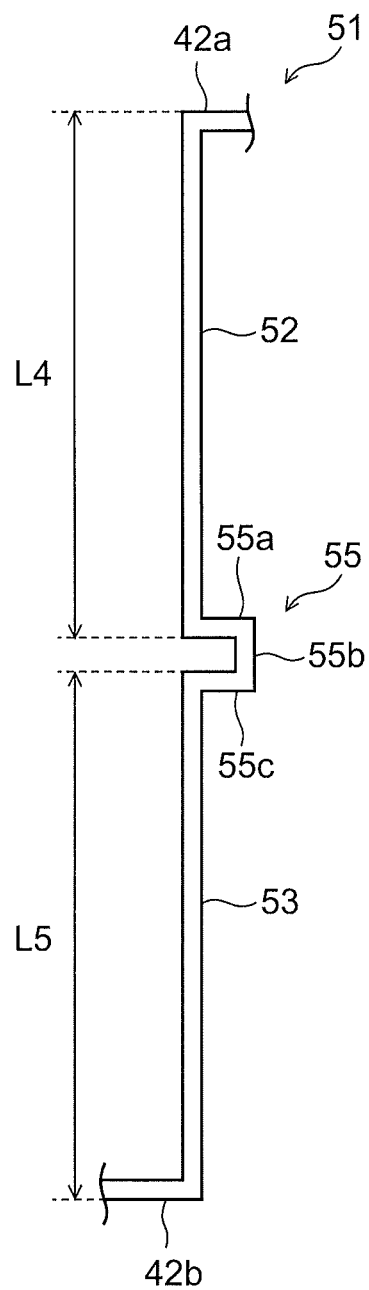
FIG. 2 is a view of another example of a structure of a pipe provided in the additive manufacturing apparatus according to the first embodiment.
Figure 3:
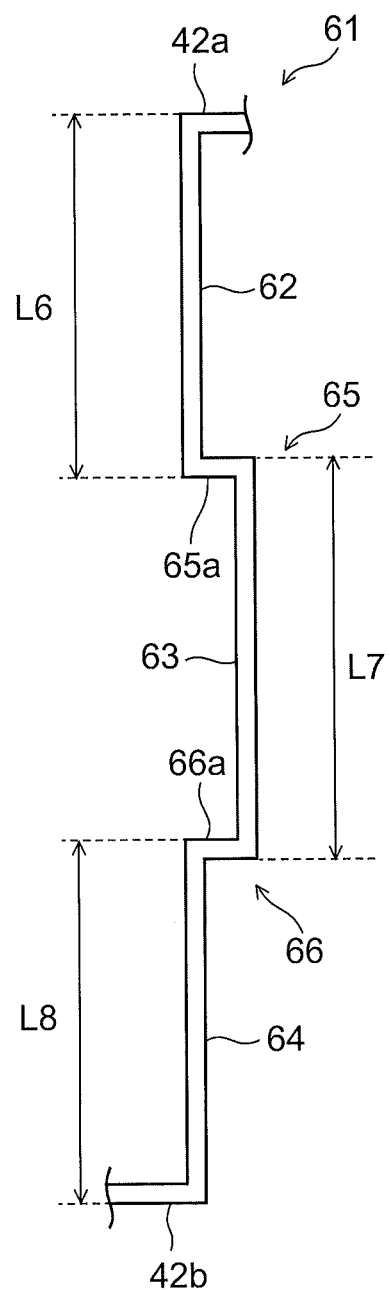
FIG. 3 is a view of another example of the structure of the pipe provided in the additive manufacturing apparatus according to the first embodiment.
Figure 4:
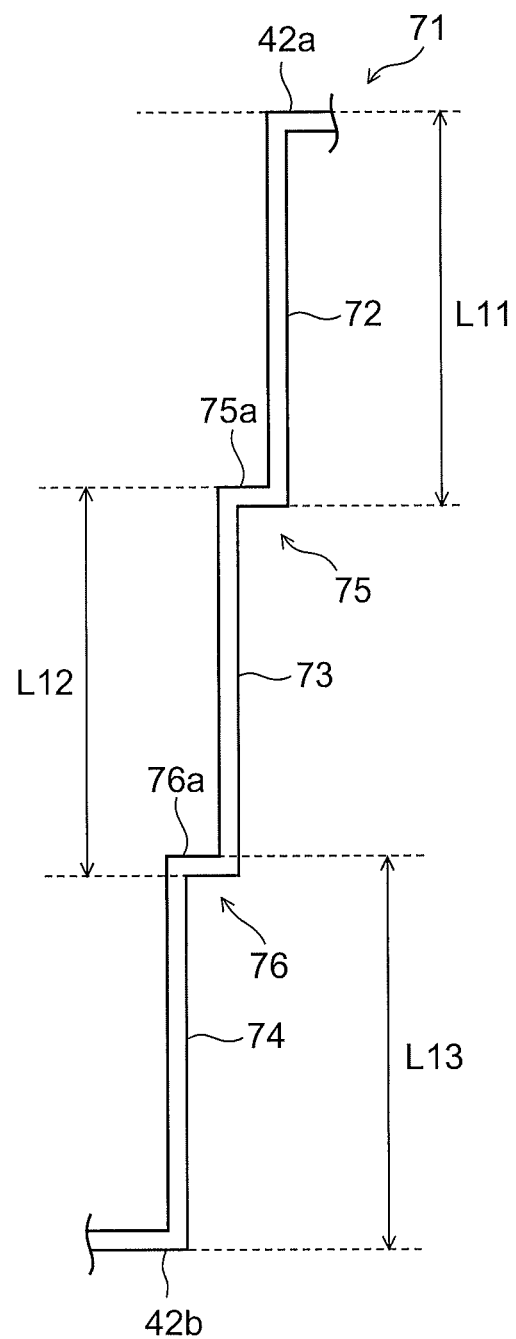
FIG. 4 is a view of another example of the structure of the pipe provided in the additive manufacturing apparatus according to the first embodiment.

The pipe 41 provided in the additive manufacturing apparatus 1 according to this embodiment shown in FIG. 1 may also be structured as shown in FIG. 2 to FIG. 4.

For example, as shown in FIG. 2, one bent part 55 may be provided in a transfer section in which the powder material is transferred from a lower side to an upper side of a pipe 51 in the vertical direction (in short, between a lower end 42b to an upper end 42a of the pipe 51). The bent part 55 has a shape in which two horizontal pipes 55a, 55c extending in the horizontal direction and one vertical pipe 55b extending in the vertical direction are connected with each other in a U-shape. One end of the horizontal pipe 55a is connected with a pipe 52, and the other end of the horizontal pipe 55a is connected with one end of the vertical pipe 55b. One end of the horizontal pipe 55c is connected with a pipe 53, and the other end of the horizontal pipe 55c is connected with the other end of the vertical pipe 55b.

At this time, when the powder material inside the pipe 52 falls freely, the maximum falling distance corresponds to a length L4 of the pipe 52. When the powder material inside the pipe 53 falls freely, the maximum falling distance corresponds to a length L5 of the pipe 53. For example, when the powder material to be used is light, energy of the powder material is also reduced. Therefore, when the powder material becomes light, a falling distance, at which the powder material collides and agglutinates with each other when the powder material falls, becomes long. In such a case, it is possible to provide only one bent part 55 in the pipe 51. In other words, it is possible to lengthen the lengths L4 and L5 of the pipes 52, 53 extending in the vertical direction. For example, the bent part 55 may be arranged so that, for example, the length L4 and the length L5 are equal to each other.

In this embodiment, as shown in FIG. 3, L-shaped bent parts 65, 66 may be provided in a transfer section in which the powder material is transferred from a lower side to an upper side of a pipe 61 in the vertical direction (in short, between a lower end 42b and an upper end 42a of the pipe 61). The bent part 65 is formed by providing a horizontal pipe 65a extending in the horizontal direction between a pipe 62 and a pipe 63 that extend in the vertical direction. The bent part 66 is formed by providing a horizontal pipe 66a extending in the horizontal direction between the pipe 63 and a pipe 64 that extend in the vertical direction.

At this time, when the powder material inside the pipe 62 falls freely, the maximum falling distance corresponds to a length L6 of the pipe 62. When the powder material inside the pipe 63 falls freely, the maximum falling distance corresponds to a length L7 of the pipe 63. When the powder material inside the pipe 64 falls freely, the maximum falling distance corresponds to a length L8 of the pipe 64. In this case, the bent parts 65, 66 are also arranged so that the maximum falling distances L6 to L8 of the powder material when the suction is stopped become shorter than a falling distance at which the powder material collides and agglutinates with each other when the powder material falls. For example, the bent parts 65, 66 may be arranged so that the length L6, the length L7, and the length L8 become equal to each other.

Further, in this embodiment, as shown in FIG. 4, L-shaped bent parts 75, 76 may be provided in a transfer section in which the powder material is transferred from a lower side to an upper side of a pipe 71 in the vertical direction (in short, between a lower end 42b and an upper end 42a of the pipe 71). The bent part 75 is formed by providing a horizontal pipe 75a extending in the horizontal direction between a pipe 72 and a pipe 73 that extend in the vertical direction. Further, the bent part 76 is formed by providing a horizontal pipe 76a extending in the horizontal direction between the pipe 73 and a pipe 74 that extend in the vertical direction. In the example shown in FIG. 4, the bent parts 75, 76 are provided so that the pipe 71 has a step shape.

When the powder material inside the pipe 72 falls freely, the maximum falling distance corresponds to a length L11 of the pipe 72. When the powder material inside the pipe 73 falls freely, the maximum falling distance corresponds to a length L12 of the pipe 73. When the powder material inside the pipe 74 falls freely, the maximum falling distance corresponds to a length L13 of the pipe 74. In this case, the bent parts 75, 76 are also arranged so that the maximum falling distances L11 to L13 of the powder material when the suction is stopped become shorter than a falling distance at which the powder material collides and agglutinates with each other when the powder material falls. For example, the bent parts 75, 76 may be arranged so that the length L11, the length L12, and the length L13 become equal to each other.

The structural examples of the pipes 41, 51, 61, 71 shown in FIG. 1 to FIG. 4 are examples only. In the additive manufacturing apparatus 1 according to this embodiment, the bent part may have any shape as long as the shape allows the powder material in the transfer section to stop falling in the middle of the transfer section when the suction is stopped.

According to the invention according to this embodiment explained so far, it is possible to provide the additive manufacturing apparatus that is able to restrain cohesion of a powder material when the powder material is transferred.

Second Embodiment

Figure 5:
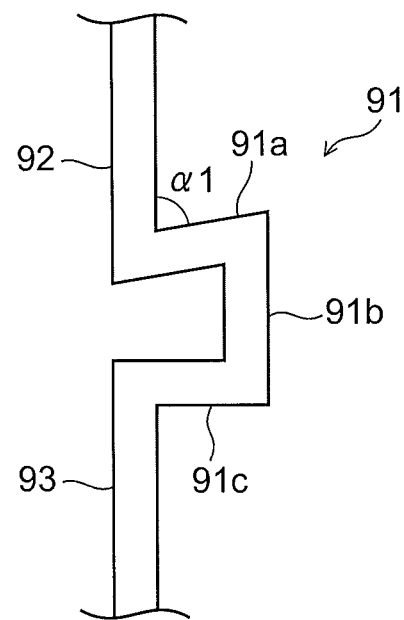
FIG. 5 is a view of an example of a structure of a pipe provided in an additive manufacturing apparatus according to the second embodiment.

Next, the second embodiment of the invention is explained. FIG. 5 is a view of a structural example of a pipe provided in an additive manufacturing apparatus according to the second embodiment. The additive manufacturing apparatus according to this embodiment is different from the additive manufacturing apparatus explained in the first embodiment in that a horizontal pipe 91a of a bent part 91 is inclined with respect to the horizontal direction. The rest of the structure is similar to that of the additive manufacturing apparatus 1 explained in the first embodiment, and duplicated explanation is thus omitted.

As shown in FIG. 5, the bent part 91 has a shape in which two horizontal pipes 91a, 91c extending in the horizontal direction and one vertical pipe 91b extending in the vertical direction are connected with each other in a U-shape. In this specification, a pipe extending in the horizontal direction includes a pipe that is slightly inclined with respect to the horizontal direction (specifically, the horizontal pipe 91a) for convenience. One end of the horizontal pipe 91a is connected with a vertical pipe 92 on a powder feeding part 36 side, and the other end of the horizontal pipe 91a is connected with one end of the vertical pipe 91b. One end of the horizontal pipe 91c is connected with a vertical pipe 93 on a powder storage part 40 side, and the other end of the horizontal pipe 91c is connected with the other end of the vertical pipe 91b.

Then, in the additive manufacturing apparatus according to this embodiment, the horizontal pipe 91a of the bent part 91 is structured so as to be inclined with respect to the horizontal direction. Specifically, the horizontal pipe 91a is structured so that an angle $\alpha 1$ formed by the horizontal pipe 91a and the vertical pipe 92 (an angle on an inner side of the bent part 91) becomes an acute angle (an angle larger than 0° and smaller than 90°). With such a structure, when suction of a powder material is stopped, the powder material is restrained from flowing backward from the vertical pipe 92 side to the vertical pipe 93 side, and it is possible to ensure that the powder material is accumulated in the bent part 91. To be specific, it is possible to accumulate the powder material in a connecting part between the horizontal pipe 91a and the vertical pipe 92.

In the additive manufacturing apparatus according to this embodiment, the bent part may also be structured as shown in FIG. 6 to FIG. 9.

Figure 6:
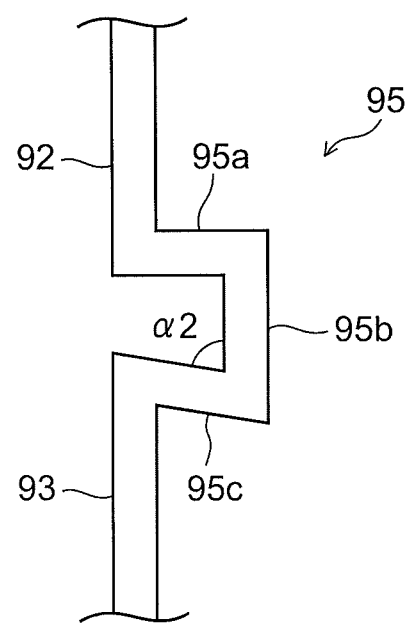
FIG. 6 a view of another example of the structure of the pipe provided in the additive manufacturing apparatus according to the second embodiment.

The bent part 95 shown in FIG. 6 has a shape in which two horizontal pipes 95a, 95c extending in the horizontal direction and one vertical pipe 95b extending in the vertical direction are connected with each other in a U-shape. In the case shown in FIG. 6, the horizontal pipe 95c of the bent part 95 is structured so as to be inclined with respect to the horizontal direction. To be specific, the horizontal pipe 95c is structured so that an angle $\alpha 2$ formed by the horizontal pipe 95c and the vertical pipe 95b, which is arranged on a powder feeding part 36 side with respect to the horizontal pipe 95c, becomes an acute angle. With this structure, when suction of a powder material is stopped, the powder material is restrained from flowing backward from the vertical pipe 92 side to the vertical pipe 93 side, and it is possible to ensure that the powder material is accumulated in the bent part 95. Specifically, it is possible to accumulate the powder material in a connecting part between the horizontal pipe 95c and the vertical pipe 95b.

Figure 7:
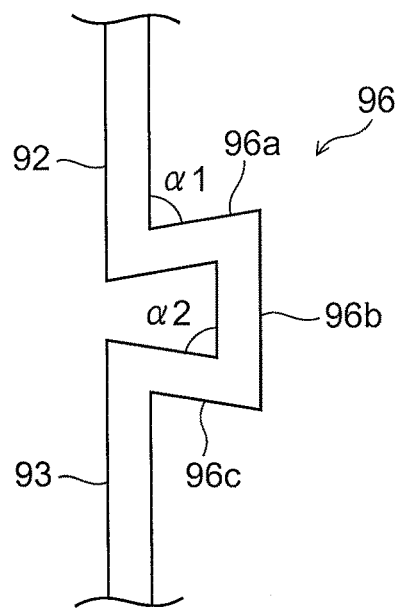
FIG. 7 is a view of another example of the structure of the pipe provided in the additive manufacturing apparatus according to the second embodiment.

A bent part 96 shown in FIG. 7 has a shape in which two horizontal pipes 96a, 96c extending in the horizontal direction and one vertical pipe 96b extending in the vertical direction are connected with each other in a U-shape. In the case shown in FIG. 7, the horizontal pipe 96a and the horizontal pipe 96c of the bent part 96 are structured so as to be inclined with respect to the horizontal direction. To be specific, the horizontal pipe 96a is structured so that an angle $\alpha 1$ formed by the horizontal pipe 96a and the vertical pipe 92 becomes an acute angle. Also, the horizontal pipe 96c is structured so that an angle $\alpha 2$ formed by the horizontal pipe 96c and the vertical pipe 96b becomes an acute angle. With such a structure, when suction of a powder material is stopped, the powder material is restrained from flowing backward from the vertical pipe 92 side to the vertical pipe 93 side, and it is possible to ensure that the powder material is accumulated in the bent part 96. To be specific, it is possible to accumulate the powder material in a connecting part between the horizontal pipe 96a and the vertical pipe 92 and in a connecting part between the horizontal pipe 96c and the vertical pipe 96b.

Figure 8:
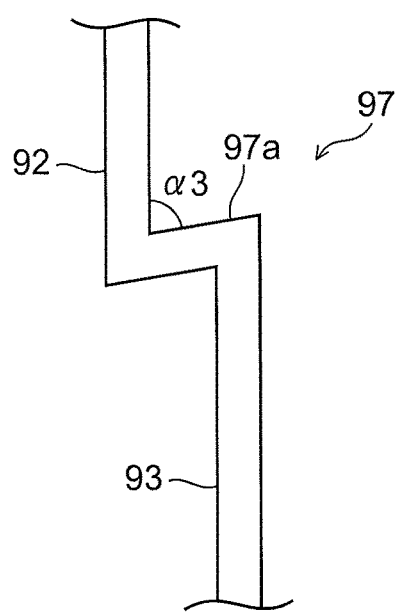
FIG. 8 is a view of another example of the structure of the pipe provided in the additive manufacturing apparatus according to the second embodiment.

A bent part 97 shown in FIG. 8 is formed by providing a horizontal pipe 97a extending in the horizontal direction between a vertical pipe 92 and a vertical pipe 93 extending in the vertical direction. In the case shown in FIG. 8, the horizontal pipe 97a of the bent part 97 is structured so as to be inclined with respect to the horizontal direction. To be specific, the horizontal pipe 97a is structured so that an angle $\alpha 3$ formed by the horizontal pipe 97a and the vertical pipe 92 becomes an acute angle. With such a structure, when suction of a powder material is stopped, the powder material is restrained from flowing backward from the vertical pipe 92 side to the vertical pipe 93 side, and it is possible to ensure that the powder material is accumulated in the bent part 97. To be specific, it is possible to accumulate the powder material in a connecting part between the horizontal pipe 97a and the vertical pipe 92.

Figure 9:
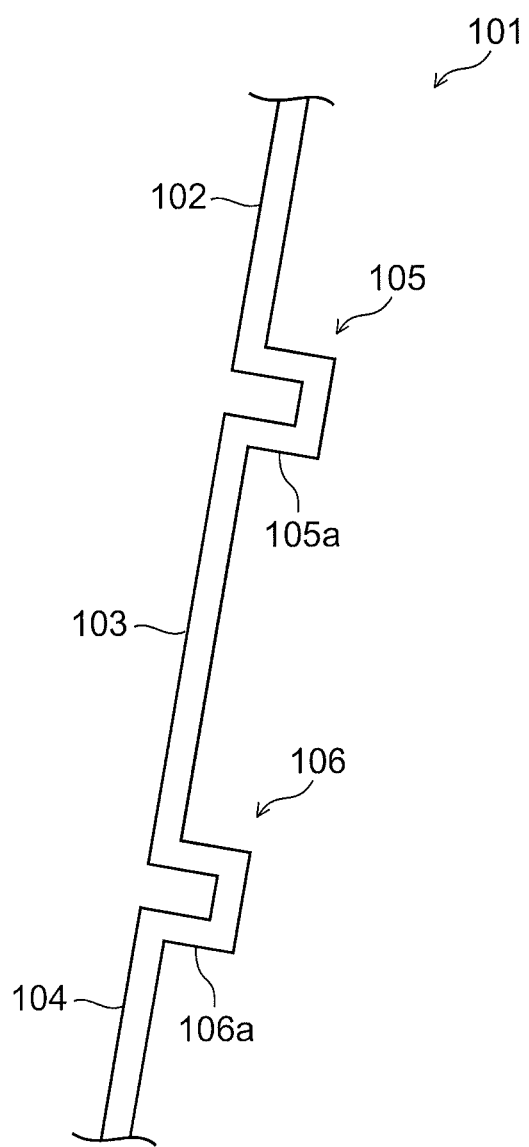
FIG. 9 is a view of another example of the structure of the pipe provided in the additive manufacturing apparatus according to the second embodiment.

In the additive manufacturing apparatus according to this embodiment, a pipe may be structured as shown in FIG. 9 in which a pipe 101 having bent parts 105, 106 is inclined with respect to the vertical direction. By allowing the pipe 101 to be inclined with respect to the vertical direction, it is possible to incline horizontal pipes 105a, 106a, which structure the bent parts 105, 106, respectively, with respect to the horizontal direction, and it is thus possible to ensure that a powder material is accumulated in the bent parts 105, 106.

Third Embodiment

Figure 10:
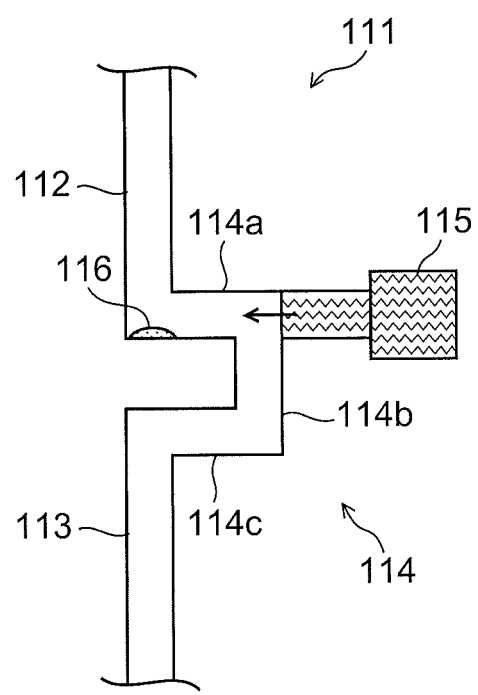
FIG. 10 is a view of an example of a structure of an additive manufacturing apparatus according to the third embodiment.

Next, the third embodiment of the invention is explained. FIG. 10 is a view of a structural example of an additive manufacturing apparatus according to the third embodiment, and is an enlarged view of the vicinity of a bent part 114 of a pipe 111 (corresponding to the pipe 41 in FIG. 1). The additive manufacturing apparatus according to this embodiment is different from the additive manufacturing apparatus explained in the first and second embodiments in that a pressurizing part 115 is provided in the bent part 114. The rest of the structure is similar to that of the additive manufacturing apparatus 1 explained in the first and second embodiments, and duplicated explanation is thus omitted.

As shown in FIG. 10, the bent part 114 is provided between pipes 112, 113 extending in the vertical direction. The bent part 114 has a shape in which two horizontal pipes 114a, 114c extending in the horizontal direction and one vertical pipe 114b extending in the vertical direction are connected with each other in a U-shape. In the additive manufacturing apparatus according to this embodiment, the pressurizing part 115 is provided in a connecting part between the horizontal pipes 114a and the vertical pipe 114b. The pressurizing part 115 increases a flow rate of gas flowing in the horizontal pipe 114a at the time of suction and helps transfer of a powder material 116 accumulated in the horizontal pipe 114a.

After a powder material is sucked from a powder feeding part 36 side and transferred from the powder storage part 40 to the powder feeding part 36, when the suction from the powder feeding part 36 side is stopped, the powder material 116 is accumulated in the connecting part between the vertical pipe 112 and the horizontal pipe 114a. As the suction from the powder feeding part 36 side is resumed, the accumulated powder material 116 is transferred to the powder feeding part 36 side. However, since the connecting part between the vertical pipe 112 and the horizontal pipe 114a is a corner part, there are instances where it is difficult to transfer the accumulated powder material 116.

Thus, in the additive manufacturing apparatus according to this embodiment, the pressurizing part 115 is provided in an end part of the horizontal pipe 114a. By providing the pressurizing part 115 as above, it is possible to increase a flow rate of gas flowing in the horizontal pipe 114a at the time of the suction, thereby helping transfer of the powder material 116 accumulated in the horizontal pipe 114a.

In FIG. 10, the case was explained where the pressurizing part 115 is provided in the U-shaped bent part 114. However, in this embodiment, the pressurizing part may be provided in the L-shaped bent parts 65, 66 shown in FIG. 3 and so on. For example, in the case where the pressurizing part is provided in the L-shaped bent part 65 shown in FIG. 3, the pressurizing part is provided in the connecting part between the horizontal pipe 65a and the pipe 63. The pressurizing part may also be provided in the bent part 91 having the structure in which the horizontal pipe 91a is inclined as shown in FIG. 5 and so on.

The invention has been explained so far based on the foregoing embodiments. However, the invention is not limited to the structures of the foregoing embodiments.

What is claimed is:

1. An additive manufacturing apparatus comprising:
a shaping part that allows a powder material to be solidified and forms a three-dimensional object;
a powder feeding part that feeds the powder material to the shaping part;
a powder storage part that stores the powder material to be fed to the powder feeding part; and
a pipe through which the powder material is transferred from the powder storage part to the powder feeding part,
wherein the powder storage part is arranged on a vertically lower side of the powder feeding part,
the powder material is transferred from the powder storage part to the powder feeding part as the powder material is sucked from the powder feeding part side,
the pipe is provided with a bent part in a transfer section in which the powder material is transferred from a lower side to an upper side in a vertical direction, the bent part stopping the falling of the powder material that is present in the transfer section in the middle of the transfer section when the suction of the powder material is stopped, and
the bent part is arranged at a position in the pipe so that a maximum falling distance of the powder material when the suction is stopped becomes shorter than a falling distance at which the powder material collides and agglutinates with each other when the powder material falls.

2. The additive manufacturing apparatus according to claim 1, wherein
the bent part has a shape in which two horizontal pipes extending in a horizontal direction and one vertical pipe extending in the vertical direction are connected with each other in a U-shape.

3. The additive manufacturing apparatus according to claim 2, wherein
the horizontal pipe is inclined with respect to the horizontal direction, and, among angles formed by the horizontal pipe and the vertical pipe arranged on a powder feeding part side with respect to the horizontal pipe, an angle on an inner side of the bent part is an acute angle.

4. The additive manufacturing apparatus according to claim 2, further comprising a pressurizing part that increases a flow rate of gas flowing in the horizontal pipe extending in the horizontal direction at a time of the suction of the powder material, and assists transfer of a powder material accumulated in the horizontal pipe extending in the horizontal direction.

* * * * *